(12) United States Patent
Zayhowski

(10) Patent No.: US 6,173,001 B1
(45) Date of Patent: Jan. 9, 2001

(54) OUTPUT COUPLERS FOR LASERS

(75) Inventor: John J. Zayhowski, Pepperell, MA (US)

(73) Assignee: Massachusetts Institute of Technology, Cambridge, MA (US)

(*) Notice: Under 35 U.S.C. 154(b), the term of this patent shall be extended for 0 days.

(21) Appl. No.: 09/025,324

(22) Filed: Feb. 18, 1998

(51) Int. Cl.$^7$ .................................................. H01S 3/08
(52) U.S. Cl. ................................ 372/108; 385/31
(58) Field of Search ........................... 372/99; 385/125, 385/31

(56) References Cited

U.S. PATENT DOCUMENTS

| | | | |
|---|---|---|---|
| 4,004,248 | * 1/1977 | Muller | 331/94.5 |
| 4,982,405 | 1/1991 | Zayhowski et al. | 372/10 |
| 5,119,382 | 6/1992 | Kennedy et al. | 372/11 |
| 5,132,977 | 7/1992 | Zayhowski et al. | 372/10 |
| 5,172,391 | * 12/1992 | Zayhowski | 372/106 |
| 5,394,413 | 2/1995 | Zayhowski | 372/10 |
| 5,552,912 | * 9/1996 | Sharp | 359/73 |
| 5,703,890 | * 12/1997 | Thony | 372/12 |
| 5,781,268 | * 7/1998 | Liu | 349/198 |
| 5,802,083 | * 9/1998 | Birnbaum | 372/11 |
| 5,966,390 | * 10/1999 | Stingl | 372/18 |

FOREIGN PATENT DOCUMENTS 1523331    8/1978   (GB).

OTHER PUBLICATIONS

E. Hecht, Optics Second Edition, 1987, pp. 56,368 and 369.
Wang, H. et al. "Guided Waves in Thin Films Consisting of Tilted Columns Deposited on Anisotropic Substrates: Excited by a Birefringent Coupler," *Pure Appl. Opt.* 5:239–250 (1996).

Huang, H. "Optical Characterization of Lithium Niobate Thin Film Waveguides Sputtered on Sapphire Substrates," *Corporate Author–Rice University Institution Code*, –00187 vol. 30–01, p. 132, 90 pages (1991).
El–Akkari, F. "Novel Passive and Active Optical Devices in Waveguide Structures," *Corporate Author–Carnegie–Mellon University Institution Code*, –0041 vol. 41–10B, p. 3848, 140 pages (1980).
Dubendorfer, J., et al. "Reference Pads for Miniature Integrated Optical Sensors," Conference title: Proceedings of the 1996 $3^{rd}$ European Conference on Optical Chemical Sensors and Biosensors Held Zurich, Switz. Mar. 31–Apr. 3, 1996.
Tang, X., et al. "Optical Waveguide Formed by Aluminum Nitride Thin Film on Sapphire," Conference title: *Electronic Imaging and Multimedia System* Held Beijing, China. Nov. 4–5, 1996.
Fattinger, C.P., et al. "Bidiffractive Grating<Coupler>: Universal Transducer for Optical Interface Analytics," *Optical Engineering* vol. 34 9:2744–2753 (1995).
Voirin, G., et al. "Digitized Dual–Frequency Coupling Grating for Waveguide Displacement Interferometry," Conference title: *Lasers and Electro–Optics Europe* Held Amsterdam, Neth. Aug. 28–Sep. 2, 1994.

(List continued on next page.)

*Primary Examiner*—Frank G. Font
*Assistant Examiner*—Gioacchino Inzirillo
(74) *Attorney, Agent, or Firm*—Hamilton, Brook, Smith & Reynolds, P.C.

(57) ABSTRACT

High-damage-threshold output couplers with reflectivities suitable for use in high-power Q-switched lasers can be constructed from two pieces of high-damage-threshold bulk material. The output couplers are formed by a thin fluid-filled gap between parallel faces of bulk materials. This forms a reflective Fabry-Perot etalon with a large bandwidth. By avoiding the use of dielectric coatings to form the output coupler, a common source of damage—optical damage to the dielectric coating—can be avoided, making it possible to produce higher-performance lasers.

33 Claims, 3 Drawing Sheets

OTHER PUBLICATIONS

Kimble, T., et al. "Optical Waveguide Characterization of Dielectric Films Deposited by Reactive Low–Voltage Ion Plating," *Applied Optics*, vol. 32–28:5640–5644 (1993).

Tang, X., et al. "An Optical Waveguide Formed by Aluminum Nitride Thin Film on Sapphire," Proceedings of the SPIE—Int. Soc. Opt. Eng. vol. 2898 192–196 (1996).

Wang, H. "Coupling to Surface Plasmon Waves by the Use of a Birefringent Prism," *Opt. Commun*, vol. 119, No. 1–2:75–77 (1995).

Huang, C.H. –J. et al. "Optical Characterization of Lithium Niobate Thin Films," 1990 IEEE $7^{th}$ International Symposium on Applications of Ferroelectrics, pp. 726–729 (1991).

Wang, Haiming and Hurtado–Ramos, Juan, "Guided waves in thin films consisting of tilted columns deposited on anisotropic substrates: excited by a birefringent coupler" *Pure Appl. Opt*. 5 239–250 (1996) Printed in the UK.

Abstract: Huang, Huang–Jia, "Optical Characterization of Lithium Niobate Thin Film Waveguides Sputtered on Sapphire Substrates—DIS 93–23–BK AA/1345318 NDN–135–01203608–7" *Corporate Author—Rice University*, vol. 30–01, pp. 132 (1991).

Abstract: El–Akkari, Fathi Rajab, "Novel Passive and Active Optical Devices in Waveguide Structures —DIS 93–12–BK AA/8100609 NDN–135–0073–7566–5" Corporate Author—*Carnegie–Mellon University*, vol. 41–10B, pp. 3848 (1980).

Abstract: Dubendorfer, J.; Kunz, R.E., "Reference pads for miniature integrated optical sensors—EIX 97–37 EIX97373739534 NDN–017–0278–5272–0" *Sensors and Actuators*, 1997.

Abstract: Tang, Xiao; Yuan, Yifang; Wongchotigu, K.; Spencer, Michael G., "Optical waveguide formed by aluminum nitride thin film on sapphire—EIX 97–20 EIX97203415075 NDN–017–0270–8254–8" Proceedings of SPIE—The International Society for Optical Engineering v 2898 p. 192–196 (1996).

Abstract: Fattinger, Christof P.; Mangold, Cyrill; Gale, Michael T.; Schuetz, Helmut, "Bidiffractive grating<coupler>: universal transducer for optical interface analytics—EIX 96–08 EIX96082939273 NDN–017–0242–5611–4" *Optical Engineering* v 34 n 9 Sep. 1995. p. 2744–2753 (1995).

Abstract: Voirin, G.; Sixt, P.; Parriaux, O.; Yan, Li, "Digitized dual–frequency coupling grating for waveguide displacement interferometry—EIX 95–09 EIX95–92505919 NDN–017–0219–1966–9" Conference on Lasers and Electro–Optics Europe—Technical Digest 1994 . IEEE, Piscataway, NJ, USA 94THO614–8. p. 339 (1994).

Abstract: Kimble, Thomas C.; Himel, Marc D.; Guenther, Karl H., "Optical waveguide characterization of dielectric films deposited by reactive low–voltage ion plating—EIX 94–02 EIX94021132187 NDN–017–0196–1016–0", *Applied Optics* v 32 n 28 Oct. 1 1993, p. 5640–5644 (1993).

Abstract: Tang, X.; Wongchotigul, K., Spencer, M.G., "An optical waveguide formed by aluminum nitride thin film on sapphire—INS 97–02 5467198 A9704–4280L–003 (PHA); B9702–4130–026 (EEA) NDN–083–0546–7197–5" Proceedings of the SPIE—The International Society for Optical Engineering , vol. 2898, pp. 192–196 (1996).

Abstract: Wang, Haiming, "Coupling to surface plasmon waves by the use of a birefringent prism<coupler>—INS 95–37 5055342 A9520–4280L–014 (PHA) NDN–083–0505–5342–0" *Optics Communications*, vol. 119 No. 1–2 Aug. 15, 1995, pp. 75–77 (1995).

Huang, C.H. –J.; Chui, H. C. –K.; Stone, B.A.; Rost, T.A.; Rabson, T.A.; "Optical characterization of lithuim niobate thin films—INS 93–02 4324270 A9304–4280L–020 (PHA); B9302–4230–038 (EEA) NDN–083–0432–4270–1" 1990 IEEE $7^{th}$ International Symposium on Applications of Ferroelectrics (Cat. No. 90CH2800–1) pp. 726–729 (1991).

* cited by examiner

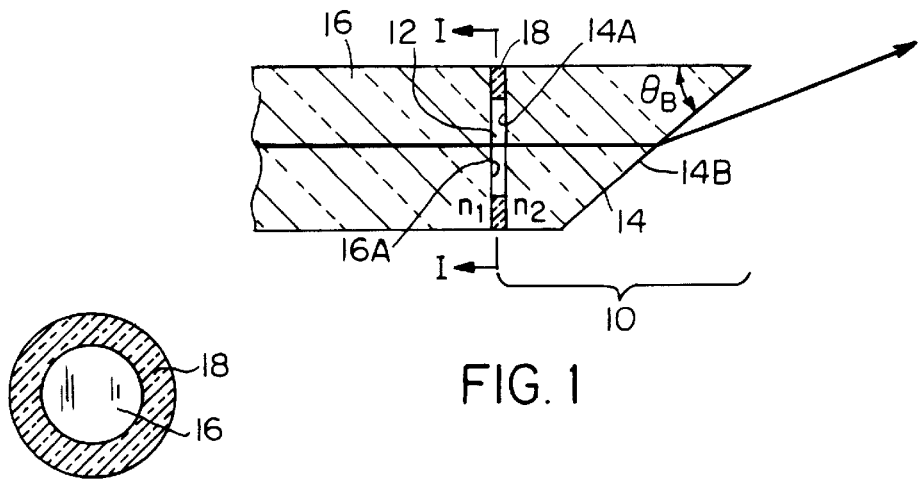
FIG. 1
FIG. 1A
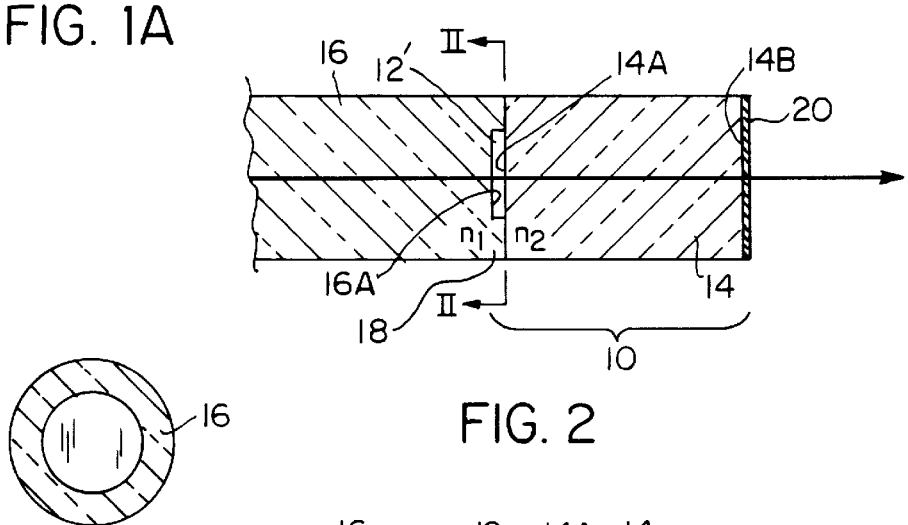
FIG. 2
FIG. 2A
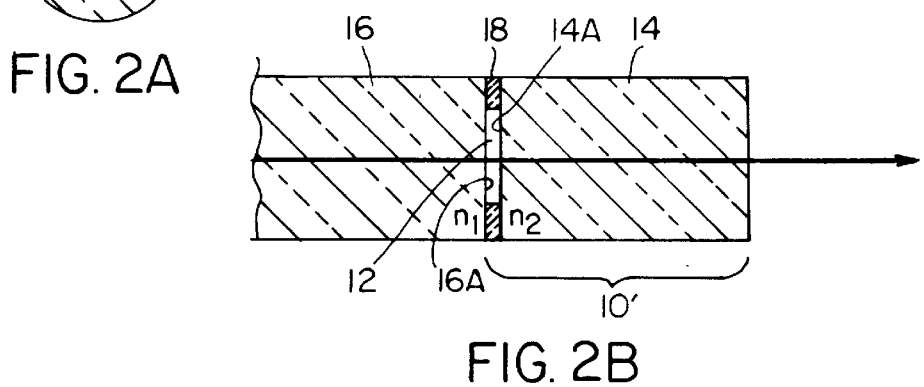
FIG. 2B
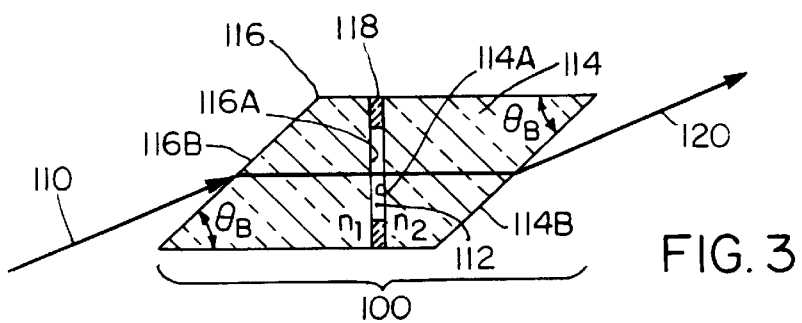
FIG. 3

OUTPUT COUPLERS FOR LASERS

GOVERNMENT SUPPORT

This invention was made with government support under Contract Number F19628-95-C-0002 awarded by the Air Force. The government has certain rights in the invention

BACKGROUND OF THE INVENTION

This invention relates to the fields of lasers and optics.

A frequent problem in the performance of solid state lasers is optical damage to the dielectric coatings forming the output coupler. Such multilayer dielectric-film coatings are generally the weakest element in a laser system, and typically fail at intensities below 10 GW/cm$^2$ or fluences below 5 J/cm$^2$. In high-gain pulsed lasers, the optical intensity at the output coupler is often larger than at other surfaces, making the output coupler a common source of problems.

In contrast to dielectric films, there are many bulk optical materials with a damage threshold in excess of 100 GW/cm$^2$. As a result, polished etalons made from dielectric materials, such as quartz or sapphire, with highly parallel faces are often used as the output mirrors for pulsed high-power lasers. That is, the lasers are operated with a 100% mirror on one end and a polished etalon a few millimeters or a centimeter thick, generally with no additional coatings, as the output coupler on the other end. Since these lasers typically have large round-trip gains, they operate best with low-reflectivity output mirrors, and the uncoated dielectric etalon provides a simple way of achieving the necessary output mirror reflectivity. These uncoated etalons are simple to fabricate and can have very high optical-damage thresholds.

If a bulk etalon, as described above, is used in a solid-state laser, at least one end—the output end—of the solid-state gain medium must be treated to eliminate reflections at the solid-to-air interface. This could be done by depositing a dielectric antireflection coating on the gain medium, or by cutting the gain medium at Brewster's angle. The use of such a dielectric coating can result in a lower threshold for optical damage. Cutting the gain medium at Brewster's angle complicates the fabrication of the device and can lead to poorer performance.

SUMMARY OF THE INVENTION

In accordance with the invention, an output coupler is formed of two bodies of bulk material separated by a fluid-filled gap between the highly parallel faces of the bodies. Preferably, the bodies are formed of a high-damage-threshold material such as rutile (TiO$_2$) and the spacing between the bodies is an odd multiple of one-quarter wavelength apart to achieve maximum reflectivity.

BRIEF DESCRIPTION OF THE DRAWINGS

FIG. 1 is a schematic of a first embodiment of the invention showing a partially reflecting output coupler formed by two transparent bulk dielectric materials ($\theta_B$, Brewster's angle; $n_1$, refractive index of medium 16; $n_2$, refractive index of medium 14).

FIG. 1A is a sectional view of one embodiment of spacer 18 along lines I—I.

FIG. 2 is a schematic of an alternate embodiment of the invention showing a partially reflecting output coupler comprising a compound etalon formed by a fluid-filled gap between two transparent bulk dielectric materials and a bulk dielectric etalon formed by the second dielectric material ($n_1$, refractive index of medium 16; $n_2$, refractive index of medium 14).

FIG. 2A is a sectional view along lines II—II of FIG. 2.

FIG. 2B is a schematic as in FIG. 2 in which a compound etalon 10' is formed.

FIG. 3 is a schematic of a further embodiment illustrating a stand-alone partially reflecting output coupler formed by a fluid-filled gap between two transparent bulk dielectric materials ($\theta_B$, Brewer's angle; $n_1$, refractive index of medium 16; $n_2$, refractive index of medium 14).

Figure 4:
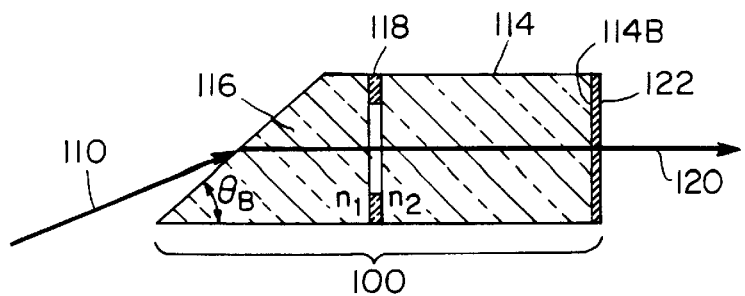
FIG. 4 is a schematic of another embodiment illustrating a stand-alone partially reflecting output coupler comprising a compound etalon formed by a fluid-filled gap between two transparent bulk dielectric materials and a bulk dielectric etalon formed by the second dielectric material ($\theta_B$, Brewster's angle; $n_1$, refractive index of medium 116; $n_2$, refractive index of medium 114).

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

First and second embodiments of the invention are shown in FIGS. 1 and 2, respectively, wherein the output face 16A of a gain medium 16 is used as one side of an air-gap (or inert gas-filled) etalon 10 formed by the highly parallel faces 16A and 14A on the gain medium 16 and a second dielectric material 14. The opposite side of the second dielectric material 14 can be provided with antireflection coating 20 as shown in FIG. 2 or cut at Brewster's angle $\theta_B$, to form the output facet 14B as in FIG. 1. Since this facet 14B is external to the laser cavity, the dielectric coating 20 will see a lower intensity than if it were inside the cavity (on the gain medium), and a Brewster's angle cut becomes less critical.

The maximum reflectivity is achieved when the length of the air-gap etalon is an odd multiple of one-quarter of the oscillating wavelength. In this case, the reflectivity of the etalon is given by $$R = 1 - \left( \frac{\left(1 - \left(\frac{n_1 - 1}{n_1 + 1}\right)^2\right)\left(1 - \left(\frac{n_2 - 1}{n_2 + 1}\right)^2\right)}{\left(1 + \left(\frac{n_1 - 1}{n_1 + 1}\right)\left(\frac{n_2 - 1}{n_2 + 1}\right)\right)^2} \right),$$

where $n_1$ is the refractive index of the first dielectric material (the gain medium) and $n_2$ is the refractive index of the second dielectric material. The spacer 18 for forming the gap 12, may be formed of any suitable material, such as quartz, sapphire or gold. The fluid in the gap 12 may comprise air or an inert gas, such as argon. An additional benefit of the air-gap etalon, compared to the bulk dielectric etalon, is that the air-gap etalon can be made extremely thin. Thinner etalons have a larger free spectral range than thicker etalons. By making the etalon only one (or a few) odd quarter wavelength(s) thick, the spectral profile of the output coupler can be extremely flat over the bandwidth of interest. Thin air gaps can be accurately fabricated by depositing the spacer 18 on one of the materials before bonding the two materials together. Alternatively, instead of a spacer, a shallow pocket to form an air gap 12' can be accurately etched into one of the materials before they are joined along lines II—II of the embodiment of FIG. 2.

In an alternate embodiment, shown in FIG. 2B, instead of forming a Brewster's angle, the opposite side of the second dielectric material 14 is polished to be parallel to the air-gap faces 16A and 14A, forming a compound etalon 10'. Such compound etalons will have bandwidths similar to the simple bulk etalons described in the background, except that the reflectivities can be much higher. The maximum reflectivity of the compound etalon 10' is given by $$R = 1 - \left( \frac{\left(1 - \left(\frac{n_1 - 1}{n_1 + 1}\right)^2\right)\left(1 - \left(\frac{n_2 - 1}{n_2 + 1}\right)^2\right)^2}{\left(\left(1 + 2\left(\frac{n_1 - 1}{n_1 + 1}\right)\left(\frac{n_2 - 1}{n_2 + 1}\right) + \left(\frac{n_2 - 1}{n_2 = 1}\right)^2\right)^2\right)} \right).$$

Figure 5:
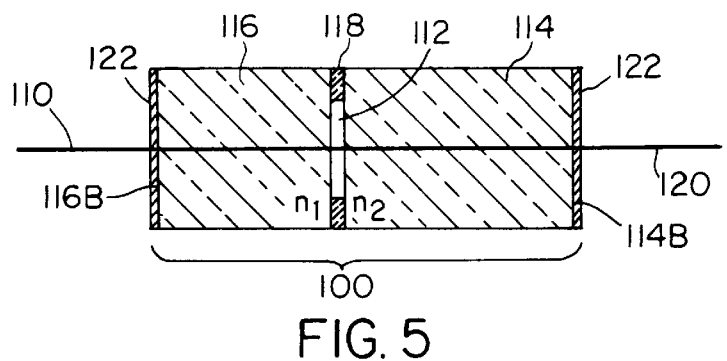
FIG. 5 is a schematic of yet another embodiment showing a stand-alone partially reflecting output coupler comprising a compound etalon formed by a fluid-filled gap between two bulk dielectric etalons ($n_1$, refractive index of medium 116; $n_2$, refractive index of medium 114).

There are also benefits to the air-gap etalon that make it useful as a stand-alone high-damage-threshold output coupler for an optical cavity, independent of the gain media, as shown in FIGS. 3, 4 and 5. It may be advantageous, in some applications, to put a dielectric coating on one or more of the flat surfaces to fine tune the reflectivity of the output coupler.

In FIG. 3, a stand-alone output coupler 100 is shown which can be used to efficiently couple input power 110 from an optical cavity or device to output power 120. The input power 110 is coupled to an optical bulk medium 116 forming one side of the partial reflector or output coupler 100. The input face 116B is cut at a Brewster's angle $\theta_B$. The output face 116A is formed substantially planar and spaced parallel to a similarly planar face 114A on bulk medium 114 by spacer 118. Again, the space 112 may be filled with air or an inert gas, and the gap is preferably an odd multiple of one-quarter the optical wavelength.

FIG. 4 is identical to FIG. 3, except that the output face 114B of body 114 has an optional dielectric coating 122 as in FIG. 2 rather than being formed at a Brewster's angle. Likewise, FIG. 5 is identical to the embodiment of FIG. 4 except that both bodies 116 and 114 are formed without Brewster's angles $\theta_B$ on the respective input and output faces, and instead may use optional dielectric coatings 122.

As described in FIG. 2, compound etalons can be formed by eliminating the dielectric coatings 122 in FIGS. 4 and 5.

Figure 6:
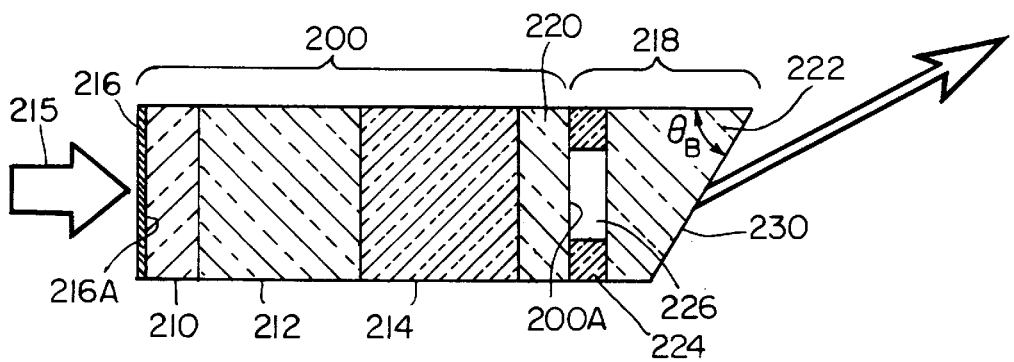
FIG. 6 is a schematic of a first laser embodiment of the invention showing a passively Q-switched laser with an air-gap etalon of the type shown in FIG. 1 as an output coupler.
Figure 7:
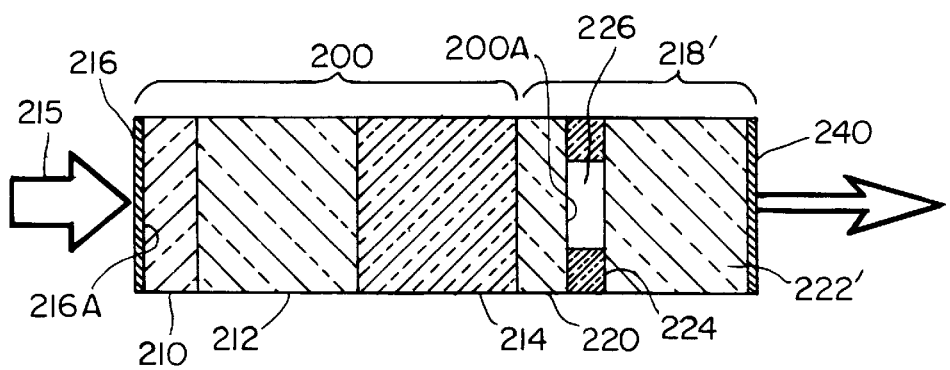
FIG. 7 is a schematic of a second laser embodiment of the invention showing a passively Q-switched laser with a compound etalon of the type shown in FIG. 2 as an output coupler.

Referring now to FIGS. 6 and 7, preferred embodiments of high-power miniature lasers will now be described in which the output couplers of the invention are used to advantage to extract high power from the laser cavity 200. As shown in FIG. 6, a typical passively Q-switched laser is comprised of a body of material 212 such as $Nd^{3+}$:YAG forming a gain medium which is coupled, normally by bonding, to a saturable absorber crystal 214, for example $Cr^{4+}$:YAG. Both media are polished flat on opposing faces and mounted in parallel normal to the optic axis. The active media may be capped with transparent media 210 and 220, for example undoped YAG, to help control thermal problems. Elements 212 and 214 and optional elements 210 and 220 form a laser cavity 200 bounded at the pump side facet 216A by an input coupler 216 in the form of a dielectric coating which is highly reflective at the laser-cavity oscillating frequency and highly transmissive of the pump light 215 from a pump source (not shown).

The output face 200A of the cavity 200 is bonded to an output coupler 218 of the invention in the form of the body 220 (or 214 if optional element 220 is not used) of polished flat transparent solid dielectric material, such as YAG, which interfaces with a second body 222 of optical material, such as rutile, with a high threshold for optical damage. In accordance with the invention, the two opposing faces of the bodies 220 and 222 are separated an odd number of ¼ wavelengths by spacer 224, leaving a gap 226 in which air or an inert gas is disposed. The opposing faces are preferably flat and parallel to each other and normal to the optical axis of the laser cavity 200. The output face 230 is either formed at the Brewster's angle $\theta_B$ as in FIG. 6 or as shown in FIG. 7 flat and provided with an optional dielectric coating 240. FIG. 7 is otherwise identical to FIG. 6.

In any of the above embodiments, the use of a birefringent medium as one of the two dielectric materials can result in a polarizing output coupler.

Further details of Q-switched lasers can be found in the following U.S. Pat. Nos. 4,982,405; 5,132,977 and 5,394,413 of Zayhowski, incorporated herein in their entirety by reference.

Figure 8:
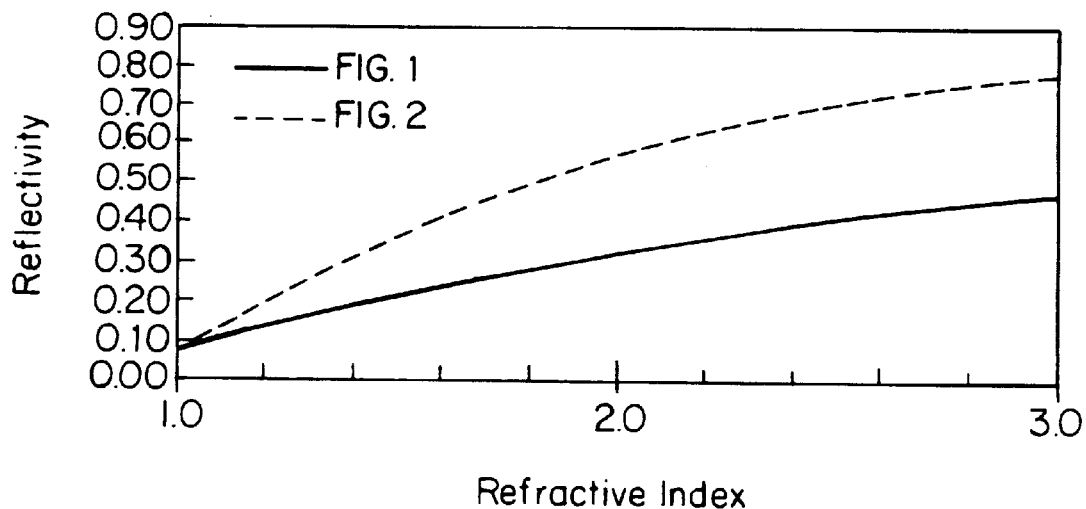
FIG. 8 is a graph showing the output-coupler reflectivities that can be achieved with output couplers of the types shown in FIGS. 1 and 2, with no dielectric coatings, with YAG as medium 16 (corresponding to $n_1$ in FIGS. 1 and 2) as a function of the refractive index of medium 14.

The output coupler reflectivities that can be achieved with YAG as the medium 16 in FIGS. 1 and 2B are shown in FIG. 8 as a function of the refractive index of the medium 14.

The values of the reflectivity for the cases where the elements 14, 114 and 116 are composed of a single medium and are rutile, YAG, sapphire or quartz, and no dielectric coatings are used, is shown below in Table 1 versus each embodiment depicted in FIGS. 1–5. The wavelength of interest is 1.064 $\mu$m.

TABLE 1

| | | Reflectivity | | | | |
|---|---|---|---|---|---|---|
| Material | Index | FIG. 1 | FIG. 2 | FIG. 3 | FIG. 4 | FIG. 5 |
| Rutile $n_e$* | 2.740 | 0.4431 | 0.7456 | 0.5851 | 0.8232 | 0.9315 |
| Rutile $n_o$* | 2.480 | 0.4057 | 0.6986 | 0.5188 | 0.7690 | 0.8996 |
| YAG | 1.818 | 0.2867 | 0.5107 | 0.2867 | 0.5107 | 0.6927 |
| Sapphire | 1.750 | 0.2722 | 0.4837 | 0.2578 | 0.4699 | 0.6517 |
| Quartz | 1.540 | 0.2243 | 0.3887 | 0.1655 | 0.3250 | 0.4873 |

*Rutile is highly birefringent and has two entries, corresponding to the ordinary ($n_o$) and extraordinary ($n_e$) polarization.

Figure 9:
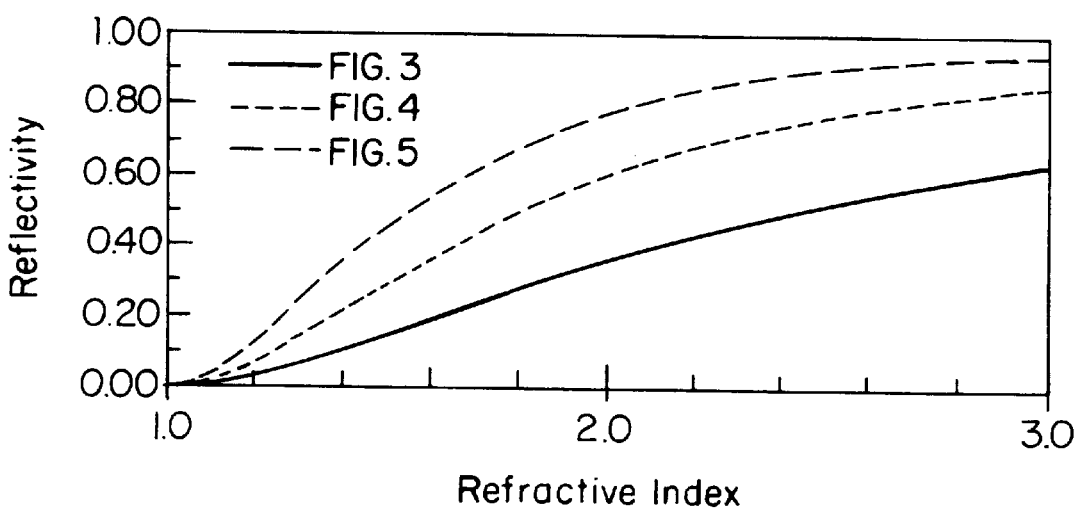
FIG. 9 is a graph showing the reflectivities that can be achieved with stand-alone output couplers of the types shown in FIGS. 3, 4 and 5, with no dielectric coatings, with a single medium, as a function of the medium's refractive index.

FIG. 9 is a plot of reflectivities achievable with stand-alone output couplers of the types shown in FIGS. 3, 4 and 5 with a single medium and no dielectric coatings as a function of the medium's refractive index.

EQUIVALENTS

While this invention has been particularly shown and described with references to preferred embodiments thereof, it will be understood by those skilled in the art that various changes in form and detail may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A partial reflector disposed in an optical cavity comprising a gas-filled space between two parallel polished faces of two bulk transparent dielectric bodies, wherein a reflective property of the partial reflector is defined primarily by the two faces and gap therebetween.

2. An output coupler for an optical cavity comprising a fluid-filled gap between two polished flat parallel faces of two bulk transparent dielectric bodies, wherein a reflective property of the output coupler is defined primarily by the two faces and gap therebetween.

3. The output coupler of claim 2, wherein the gap between the two bulk dielectric bodies is formed by a thin spacer.

4. The output coupler of claim 2, wherein the optical cavity is a laser cavity having a solid state gain medium host material.

5. The output coupler of claim 4, wherein the laser is a passively Q-switched Nd:YAG laser.

6. An output coupler for an optical cavity comprising a fluid-filled gap between two polished flat parallel faces of two bulk transparent dielectric bodies, wherein a reflective property of the output coupler is defined primarily by the two faces and gap therebetween, and one of the bulk dielectric bodies is chosen from the group comprising titanium dioxide ($TiO_2$), yttrium aluminum garnet (YAG), sapphire ($Al_2O_3$) or quartz ($SiO_2$).

7. An output coupler for an optical cavity comprising a fluid-filled gap between two polished flat parallel faces of two bulk transparent dielectric bodies, wherein a reflective property of the output coupler is defined primarily by the two faces and gap therebetween and the fluid is air or an inert gas.

8. An output coupler for an optical cavity comprising a fluid-filled gap between two polished flat parallel faces of two bulk transparent dielectric bodies, wherein a reflective property of the output coupler is defined primarily by the two faces and gap therebetween and the gap is formed by thin pockets etched into one of the bulk dielectric bodies, and the dielectric bodies are then bonded together.

9. An output coupler for an optical cavity comprising a fluid-filled gap between two polished flat parallel faces of two bulk transparent dielectric bodies, wherein a reflective property of the output coupler is defined primarily by the two faces and gap therebetween and the output coupler couples optical power from a laser cavity at an oscillating wavelength of $\lambda$, and the thickness of the fluid-filled gap is substantially a small odd integral multiple of $\lambda/4$.

10. The output coupler of claim 7, wherein one of the bulk dielectric bodies is highly birefringent, and said output coupler polarizes the oscillating wavelength of said laser.

11. An output coupler for an optical cavity comprising a fluid-filled gap between two polished flat parallel faces of two bulk transparent dielectric bodies, wherein the optical cavity is a laser cavity having a solid state gain medium host material and a reflective property of the output coupler is defined primarily by the two faces and gap therebetween, and a material of one of the bulk dielectric bodies is the same material as the host material for the gain medium of the laser.

12. An output coupler for an optical cavity including a compound etalon, the compound etalon comprising:
 a first etalon formed by a fluid-filled gap between two polished parallel faces of a first and second bulk transparent dielectric body, wherein a reflective property of the first etalon is defined primarily by the two faces and gap therebetween; and
 a second etalon defined by a thickness of the first or second dielectric body.

13. The output coupler of claim 12, wherein one of the bulk dielectric bodies is chosen from the group comprising titanium dioxide ($TiO_2$), yttrium aluminum garnet (YAG), sapphire ($Al_2O_3$) or quartz ($SiO_2$).

14. The output coupler of claim 12, wherein the fluid is air or an inert gas.

15. The output coupler of claim 12, wherein the gap between the two bulk dielectric bodies is formed by a thin spacer.

16. The output coupler of claim 12, wherein the gap is formed by thin pockets etched into one of the bulk dielectric bodies, and the dielectric bodies are then bonded together.

17. The output coupler of claim 12, wherein the output coupler couples optical power from a laser cavity at an oscillating wavelength of $\lambda$, and the thickness of the fluid-filled gap is substantially a small odd integral multiple of $\lambda/4$.

18. The output coupler of claim 12, wherein the optical cavity is a laser cavity having a solid state gain medium host material.

19. The output coupler of claim 17, wherein one of the bulk dielectric bodies is highly birefringent, and said output coupler polarizes the oscillating wavelength of said laser.

20. The output coupler of claim 18, wherein the material of one of the bulk dielectric bodies is the same material as the host material for the gain medium of the laser.

21. The output coupler of claim 18, wherein the laser is a passively Q-switched Nd:YAG laser.

22. A partial reflector disposed in an optical cavity comprising a fluid-filled space between two parallel polished faces of two bulk transparent dielectric bodies such that the fluid filling the space is in contact with the parallel polished faces of the dielectric bodies and a primary reflective property of the partial reflector is defined by the space and two faces.

23. An output coupler for an optical cavity comprising a fluid-filled gap between two polished flat parallel faces of two bulk transparent dielectric bodies such that the fluid filling the gap is in contact with the parallel polished faces of the dielectric bodies and a primary reflective property of the output coupler is defined by the gap and two faces.

24. The output coupler of claim 23, wherein one of the bulk dielectric bodies is chosen from the group comprising titanium dioxide ($TiO_2$), yttrium aluminum garnet (YAG), sapphire ($Al_2O_3$) or quartz ($SiO_2$).

25. The output coupler of claim 23, wherein the fluid is air or an inert gas.

26. The output coupler of claim 23, wherein the gap between the two bulk dielectric bodies is formed by a thin spacer.

27. The output coupler of claim 23, wherein the gap is formed by thin pockets etched into one of the bulk dielectric bodies, and the dielectric bodies are then bonded together.

28. The output coupler of claim 23, wherein the output coupler couples optical power from a laser cavity at an oscillating wavelength of $\lambda$, and the thickness of the fluid-filled gap is substantially a small odd integral multiple of $\lambda/4$.

29. The output coupler of claim 23, wherein the optical cavity is a laser cavity having a solid state gain medium host material.

30. The output coupler of claim 28, wherein one of the bulk dielectric bodies is highly birefringent, and said output coupler polarizes the oscillating wavelength of said laser.

31. The output coupler of claim 29, wherein the material of one of the bulk dielectric bodies is the same material as the host material for the gain medium of the laser.

32. The output coupler of claim 29, wherein the laser is a passively Q-switched Nd:YAG laser.

33. An output coupler for an optical cavity including a compound etalon, the compound etalon comprising:
- a first etalon formed by a fluid-filled gap between two polished parallel faces of a first and second bulk transparent dielectric body such that the fluid filling the gap is in contact with the parallel polished faces of the dielectric bodies; and
- a second etalon defined by a thickness of the first or second dielectric body.

* * * * *

UNITED STATES PATENT AND TRADEMARK OFFICE
CERTIFICATE OF CORRECTION

PATENT NO.      : 6,173,001 B1                                                          Page 1 of 1
DATED           : January 9, 2001
INVENTOR(S)     : John J. Zayhowski It is certified that error appears in the above-identified patent and that said Letters Patent is hereby corrected as shown below:

Column 5,
Line 60, delete "7" and insert -- 9 --.

Signed and Sealed this

Twenty-fifth Day of February, 2003

JAMES E. ROGAN
*Director of the United States Patent and Trademark Office*